M. J. BUCHANAN.
MOISTENER.
APPLICATION FILED MAR. 16, 1912.

1,123,675.

Patented Jan. 5, 1915.

WITNESSES
A. T. Palmer
H. M. Kelso

INVENTOR
Monty J. Buchanan
by Richard P. Elliott
attorney

UNITED STATES PATENT OFFICE.

MONTY J. BUCHANAN, OF LYNN, MASSACHUSETTS.

MOISTENER.

1,123,675.                   Specification of Letters Patent.        Patented Jan. 5, 1915.

Application filed March 16, 1912. Serial No. 684,149.

*To all whom it may concern:*

Be it known that I, MONTY J. BUCHANAN, a subject of the King of Great Britain, residing in Lynn, county of Essex, State of Massachusetts, have invented certain new and useful Improvements in Moisteners, of which the following is a specification, reference being had to the drawings accompanying the same and forming a part thereof.

The object of my invention is to so construct a moistener that the amount of moisture in the moistening pad used may be limited to the desired amount necessary to perform the work in hand, and further to provide means whereby the operator may quickly replenish the moisture in the used moistening pad from a source of supply within the device.

Figure 1:
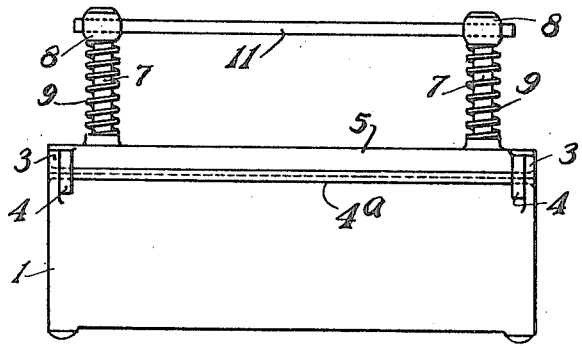
Figure 3:
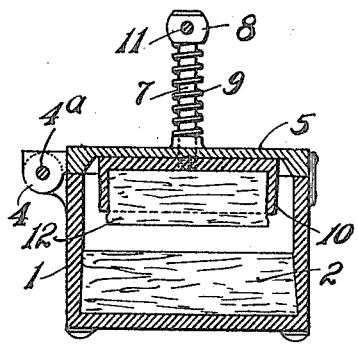
Figure 2:
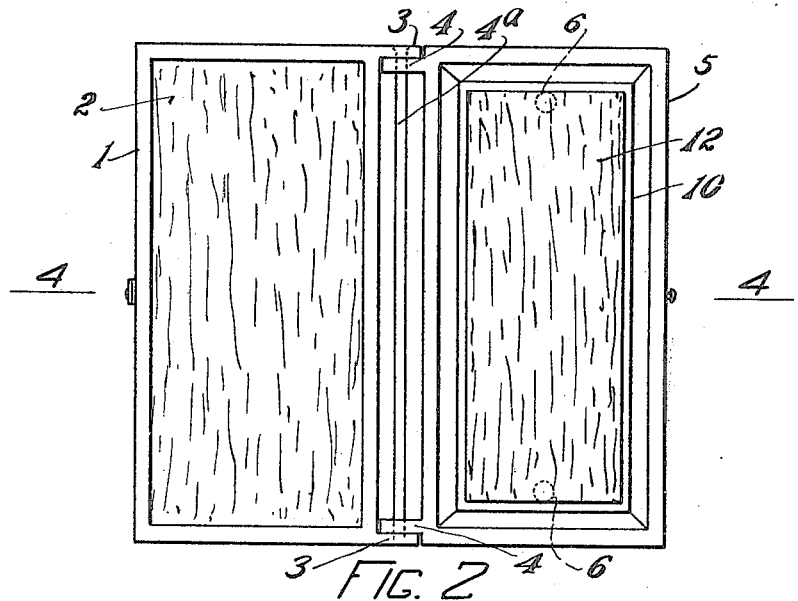
Figure 4:
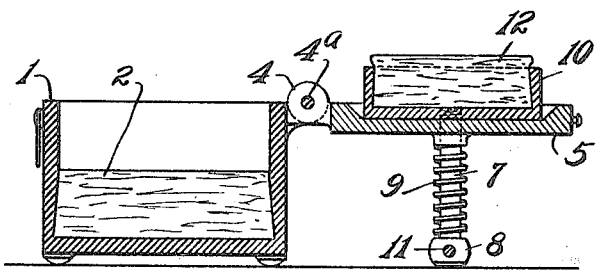

In the drawings accompanying this specification and forming a part thereof—Figure 1 is a side elevation of my device closed; Fig. 2 is a plan of the device open; Fig. 3 is a sectional end elevation taken through line 4—4 Fig. 2 with the cover closed; and Fig. 4 is a sectional end elevation through line 4—4 Fig. 2, with the cover portion open.

The body 1 of the moistening device is preferably made of metal, such as brass, aluminum, or a similar non-rusting material, and is made water-tight. Its walls, near the bottom, are preferably inclined outward from the mid-portion downwardly so as to prevent the pad inserted therein from being easily displaced. A pad 2 is fitted into the body near the bottom, its thickness being about one-half the height of the interior of the body part 1. The pad 2 is preferably made of felting, either cotton or wool, or it may be made of sponge or similar moisture absorbing material so that it will absorb and retain moisture. Hinged members 3, 3, are formed upon the outside of the body 1 near its top, arranged so that the hinge members 4, 4, of the cover 5 may be pivoted to them by means of a suitable pivot rod, such as 4ª. The hinge members 4, 4, are formed, as before stated, upon the cover 5. This cover 5 is so made that it will shut down upon the body 1 as shown in Fig. 3 and it may be provided with any suitable fastening device to keep it closed.

The cover 5 is provided with two holes 6, 6, through its top. Rods 7, 7, are fitted loosely in the holes 6, 6, so that they will have a free longitudinal movement therethrough. The rods 7, 7, have enlarged portions 8, 8, to form bearings for the upper ends of the springs 9, 9; the springs 9, 9, being confined between said enlarged portions 8, 8, and the top of the cover 5 and serve to maintain the pan 10 and pad 12 in their normal positions, as shown in Figs. 3 and 4.

The metal pan 10 is mounted in the cover 5 by means of the rods 7, 7. As before stated, the rods 7, 7, pass through the holes 6, 6, of the cover 5 and their lower ends are secured in the pan 10. A rod 11 is secured in the enlarged portions 8, 8, by being passed through holes formed therethrough. This rod serves to hold the rods 7, 7, in alinement with each other, as well as to form a handle. The pad 12 is secured in the pan 10 so its outer surface will extend slightly above the edges of the pan, as shown in Fig. 4.

As will be noted in Fig. 3, the pan 10 is shown as being held closely against the inside of the cover 5, it being held in this position by the tension of the springs 9, 9. If it is desired to bring the surfaces of the two pads in contact in order to moisten the pad 12, the operator may press down upon the rod 11, causing the rods 7, 7, to slide through the cover 12 and move the pan 10 downwardly until the surfaces of the pads are brought in contact.

The operation of my moistening device is as follows:—The pad 2 should be thoroughly saturated with moisture, preferably water and alcohol, the alcohol being used to prevent the water from becoming rancid. Then in order to moisten the upper pad, the cover 5 should be closed down, as shown in Fig. 3, and the pan 10 moved downwardly by depressing the rods 7, 7, and handle 11 until the surfaces of the pads are brought in contact, the length of contact being governed by the amount of moisture it is desired to accumulate in the pad 12. When the pad 12 has absorbed a sufficient amount of moisture, the pressure upon the rod 11 and rods 7, 7, is released to permit the pad 12 to move upwardly, the cover 5 is swung open, as shown in Fig. 4, thus exposing the surface of the pad 12 so that the surfaces of gummed labels, the gummed portion of envelops, stamps, etc., may be properly moistened thereon.

As shown in Fig. 3, the pads 2 and 12 stand apart normally and the pan 10 is inverted so that any excessive moisture that may accumulate in the pan 10 can drip downwardly onto the pad 2. In the position shown in Fig. 3 the upper pad remains comparatively dry so that the operator can gage the amount of moisture he may desire in pad 12 by having it comparatively dry to start with.

As is shown in Fig. 4, the enlarged portions 8, 8, of the rods 7, 7, serve as a support for the cover when it is open. Rubbers may be attached to the top of these enlarged portions if desired and to the lower corner of the body 1, if desired to do so, although they are not an essential part of my invention.

I do not wish to confine my invention to the exact form of the parts shown, or to their exact proportion or relation to each other. Broadly stated, my invention consists in providing two moistening pads, one of which may be thoroughly saturated with moisture at all times, and the other moistened to the extent found desirable to perform the work required.

What I claim is—

1. In a moistening device, a receptacle for moisture; a primary pad secured in the bottom of said receptacle; a cover pivoted to said receptacle; a pan movably secured to the inside of said cover so as to be inverted when the cover is closed; and a second pad secured in said pan and normally out of contact with said primary pad when the cover is closed.

2. In a moistening device, a receptacle for moisture; a pad secured to the bottom of said receptacle; a cover; a pan movably secured to said cover; rods to which said pan is secured; springs mounted on said rods, arranged to yieldingly hold said pan against the inside of the cover; hinges on said receptacle for moisture and said cover; and a pivot for said hinges.

3. In a moistening device, a receptacle for moisture; a pad secured in the bottom of said receptacle; a cover; a pan movably mounted in said cover; a plurality of rods passing through said cover and secured in said pan; and a rod connecting said first mentioned rods; springs mounted upon said first mentioned rods; and a moistening pad secured in said pan.

4. In a moistening device, a pad adapted to be saturated with moisture; a second pad; spring-controlled means to normally suspend said second pad above the first-mentioned pad out of contact therewith; but so arranged that the exposed surfaces of said pads may be caused to contact, said spring-controlled means also constituting a support for the cover when it is open.

In testimony whereof, I have hereunto set my hand, in the presence of two subscribing witnesses, this the 29th day of February, A. D. 1912.

MONTY J. BUCHANAN.

Witnesses:
GEORGE P. BECKFORD,
R. P. ELLIOTT.

Copies of this patent may be obtained for five cents each, by addressing the "Commissioner of Patents, Washington, D. C."